United States Patent
Kurita

(10) Patent No.: US 10,158,269 B1
(45) Date of Patent: Dec. 18, 2018

(54) ELECTRIC MOTOR AND HEAT SINK APPARATUS USING THE SAME

(71) Applicant: PANASONIC INTELLECTUAL PROPERTY MANAGEMENT CO., LTD., Osaka (JP)

(72) Inventor: Tsuyoshi Kurita, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/902,121

(22) Filed: Feb. 22, 2018

(30) Foreign Application Priority Data

Jun. 16, 2017 (JP) .................................. 2017-118866
Aug. 3, 2017 (JP) .................................. 2017-150661
Dec. 6, 2017 (JP) .................................. 2017-234241

(51) Int. Cl.
| | |
|---|---|
| *H02K 5/16* | (2006.01) |
| *H02K 5/167* | (2006.01) |
| *H02K 7/00* | (2006.01) |
| *F16C 33/10* | (2006.01) |
| *H02K 7/14* | (2006.01) |

(52) U.S. Cl.
CPC ......... *H02K 5/1675* (2013.01); *F16C 33/107* (2013.01); *H02K 7/003* (2013.01); *H02K 7/14* (2013.01); *F16C 2380/26* (2013.01)

(58) Field of Classification Search
CPC ........ H02K 5/1675; H02K 7/003; H02K 7/14; F16C 33/107; F16C 2380/26
USPC ........................... 310/67 R, 90; 384/100, 107
See application file for complete search history.

(56) References Cited

U.S. PATENT DOCUMENTS

| | | | |
|---|---|---|---|
| 5,715,116 A | 2/1998 | Moritan et al. | |
| 5,716,116 A | 2/1998 | Moritan et al. | |
| 6,124,657 A * | 9/2000 | Yamashita | ............ F16C 17/107 310/90 |
| 7,005,768 B2 * | 2/2006 | Tamaoka | ................ F16C 17/02 310/67 R |

(Continued)

FOREIGN PATENT DOCUMENTS

| | | |
|---|---|---|
| JP | 06-269142 | 9/1994 |
| JP | 11-252857 | 9/1999 |

(Continued)

OTHER PUBLICATIONS

Office Action issued in Japanese Patent Application No. JP 2017-118866, dated Aug. 31, 2017 along with an English translation thereof.

(Continued)

*Primary Examiner* — Thanh Lam
(74) *Attorney, Agent, or Firm* — Greenblum & Bernstein, P.L.C.

(57) ABSTRACT

An electric motor includes a frame including a cylindrical frame housing having an open end, a sleeve fitted in the frame housing, a stator attached to the outer peripheral part of the frame housing, and a rotor including a magnet disposed opposite to the stator and rotating shaft 9 rotatably and pivotally supported by the sleeve and having one fixed end. At a center portion of rotating shaft 9, tapered part 9*d* whose diameter decreases toward front end part 9*a* side is formed. Oil is provided to a gap between rotating shaft 9 and the sleeve.

8 Claims, 10 Drawing Sheets

(56) References Cited

U.S. PATENT DOCUMENTS

| | | | | |
|---|---|---|---|---|
| 7,753,590 | B2 * | 7/2010 | Shishido | F16C 33/74 |
| | | | | 384/107 |
| 9,316,253 | B2 * | 4/2016 | Okamura | F16C 33/14 |
| 9,332,686 | B2 * | 5/2016 | Yamashita | H05K 13/0015 |
| 2005/0220379 | A1 * | 10/2005 | Yazawa | F16C 17/026 |
| | | | | 384/100 |
| 2010/0310199 | A1 * | 12/2010 | Okamura | B22F 3/164 |
| | | | | 384/114 |

FOREIGN PATENT DOCUMENTS

| | | |
|---|---|---|
| JP | 11-280755 | 10/1999 |
| JP | 2003-156034 | 5/2003 |

OTHER PUBLICATIONS

Notice of Allowance issued in Japanese Patent Application No. JP 2017-118866, dated Dec. 26, 2017 along with an English translation thereof.

\* cited by examiner

|  | RATIO | | | EVALUATION |
| --- | --- | --- | --- | --- |
|  | A | : | B | |
| 6A | 1 | : | 0.1 | POOR |
| 6B | 1 | : | 1 | POOR |
| 6C | 1 | : | 1.4 | FAIR |
| 6D | 1 | : | 3.4 | GOOD |
| 6E | 1 | : | 10 | GOOD |
| 6F | 1 | : | 21 | GOOD |

FIG. 7

| | RATIO | | | EVALUATION |
|---|---|---|---|---|
| | A | : | B | |
| 9A | 1 | : | 0.1 | POOR |
| 9B | 1 | : | 1 | POOR |
| 9C | 1 | : | 1.4 | FAIR |
| 9D | 1 | : | 3.3 | GOOD |
| 9E | 1 | : | 10 | GOOD |
| 9F | 1 | : | 21 | GOOD |

FIG. 10

ELECTRIC MOTOR AND HEAT SINK APPARATUS USING THE SAME

CROSS REFERENCE TO RELATED APPLICATIONS

Japanese Patent Applications No. 2017-118866 filed on Jun. 16, 2017, No. 2017-150661 filed on Aug. 3, 2017 and No. 2017-234241 filed on Dec. 6, 2017, including description, claims, drawings, and abstract the entire disclosure is incorporated herein by reference in its entirety.

TECHNOLOGICAL FIELD

The present invention relates to an electric motor and a heat sink apparatus using the same.

BACKGROUND ART

In an electronic apparatus, a heat sink apparatus is mounted for the purpose of cooling. The heat sink apparatus generates air flow by rotating a fan with an electric motor so as to remove heat from a heat generation member.

PTL 1 discloses an electric motor (spindle motor) intended to achieve downsizing, impact resistance, low noise, and low power consumption.

CITATION LIST

Patent Literature

PTL 1
Japanese Patent Application Laid-Open No. H6-269142

SUMMARY OF INVENTION

Technical Problem

In recent years, heat sink apparatuses have been used in various technical fields including the field of medical equipment, and the life time of the heat sink apparatuses is desired to be increased.

Embodiments of the present disclosure disclose an electric motor and a heat sink apparatus using the same which can achieve longer life time in comparison with a conventional art.

Solution to Problem

An electric motor according to a mode of the present disclosure includes: a frame including a frame housing having a cylindrical shape whose one end is open; a sleeve fitted in the frame housing; a stator attached to an outer peripheral part of the frame housing; and a rotor including a rotating shaft rotatably and pivotally supported by the sleeve, and a magnet that is disposed opposite to the stator, one end of the rotating shaft being fixed. The rotating shaft has a columnar shape. A tapered part having a tapered shape whose diameter decreases toward a side of a front end of the rotating shaft is formed in a center portion of the rotating shaft, the front end being a free end. A length of the tapered part is greater than a diameter of the rotating shaft. Oil is provided to a gap between the rotating shaft and the sleeve.

Advantageous Effects of Invention

According to the present disclosure, it is possible to achieve longer life time in comparison with a conventional art.

BRIEF DESCRIPTION OF DRAWINGS

FIG. 7 shows evaluations for each of ratios between tapered parts in the rotating shaft of the electric motor according to Embodiment 3 of the present disclosure;

FIG. 10 shows evaluations for each of ratios between tapered parts in the sleeve of the electric motor according to Embodiment 4 of the present disclosure.

DESCRIPTION OF EMBODIMENTS

Embodiments of the present disclosure are described in detail below with reference to the accompanying drawings. It should be noted that details may be omitted in the descriptions as necessary. For example, details of well-known matters, overlapping descriptions between substantially identical configurations and the like may be omitted to avoid unnecessary redundancy in the descriptions, and to facilitate understanding of a person skilled in the art.

The advantages and features provided by the embodiments of the invention will become more fully understood from the detailed description given hereinbelow and the appended drawings which are given by way of illustration only, and thus are not intended as a definition of the limits of the present invention.

Embodiment 1

Figure 1:
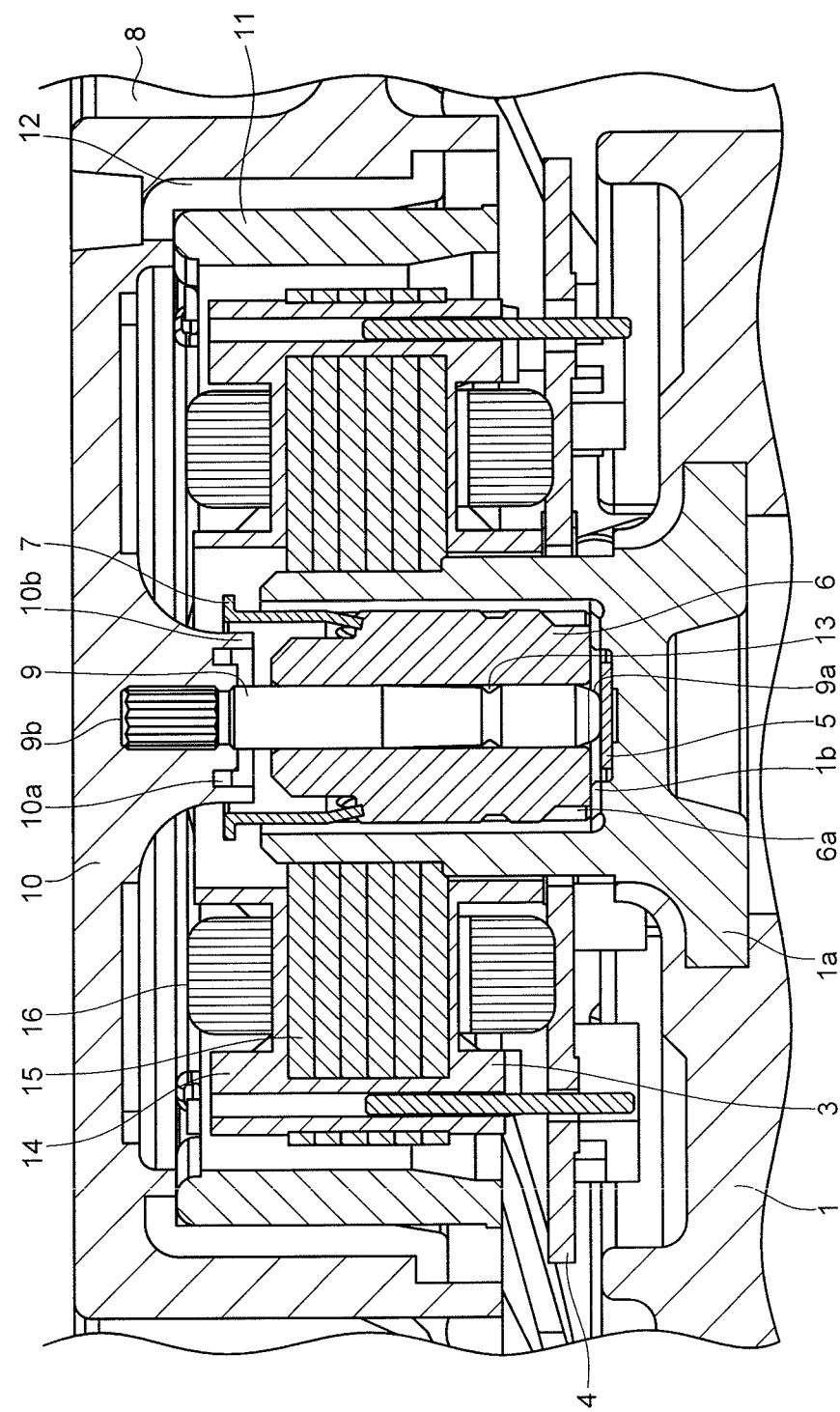
FIG. 1 is a sectional view of an electric motor in a heat sink apparatus according to Embodiment 1 of the present disclosure.

(Configuration of Electric Motor)
FIG. 1 is a sectional view of an electric motor in a heat sink apparatus of Embodiment 1. Cylindrical frame housing 1a having an open end is mounted in frame 1. Substrate 4 and stator 3 of the electric motor are attached to an outer peripheral part of frame housing 1a. Stator 3 is composed of insulation part 14 formed of an insulating material such as a synthetic resin, iron core 15 that is a stack of a plurality of thin plates, and coil 16 wound around iron core 15.

In the side wall of frame 1, a predetermined number of openings of a predetermined size through which air flow passes (not illustrated) are provided toward a predetermined direction. In addition, the bottom part of frame 1 on the side on which frame housing 1a is not provided includes a plane area where a heat generation member such as a semiconductor device can be attached. In addition, thrustor 5 formed of a resin is fixed on the bottom surface.

In frame housing 1a, sleeve 6 is fitted, and fixation ring 7 that presses down sleeve 6 is inserted. The end portion of fixation ring 7 on the insertion side is tilted inward at, for example, approximately 10 degrees so that it can be readily press-fitted into frame housing 1a.

Fan 8 is composed of a blade (not illustrated) and rotor main body 10 of the electric motor. Rear end part 9b of rotating shaft 9 is inserted and fixed at a center of rotor main body 10. In addition, magnet 11 and magnet yoke 12 are fixed to rotor main body 10 by bonding or the like so as to face annular stator 3. The rotor of the electric motor is composed of rotating shaft 9, rotor main body 10, magnet 11 and magnet yoke 12.

Further, in rotor main body 10, recessed oil pool 10a for reducing intrusion of external foreign matters and dusts into the bearing is formed at a portion around rotating shaft 9. In addition, in rotor main body 10, rib 10b is formed at the outer periphery of oil pool 10a and on the inner side of fixation ring 7.

Rotating shaft 9 is rotatably and pivotally supported by sleeve 6. A dynamic-pressure generation groove (not illustrated) for facilitating the rotation of rotating shaft 9 is formed by ball rolling or the like on the inner peripheral surface of sleeve 6. Oil 13 is provided as lubricating oil to the dynamic-pressure generation groove, and thus a radial bearing with a bearing gap of 2 to 12 μm on each side from rotating shaft 9 is formed. It is to be noted that the dynamic-pressure generation groove may be formed on the outer peripheral surface of first straight part 9e and/or second straight part 9f of rotating shaft 9 (see FIGS. 2A to 2E).

Front end part 9a (the free end opposite to rear end part 9b) of rotating shaft 9 is finished in the form of a spherical surface, and forms a thrust bearing in contact with thrustor 5.

Between frame housing 1a and sleeve 6, ventilation groove 1b that extends from the opening to the bottom surface of frame housing 1a is formed at the inner wall of frame housing 1a. In addition, oil pool 6a that is a circumferential groove is formed on the front end side (the side close to the bottom surface of frame housing 1a) of the outer peripheral surface of sleeve 6.

With the electric motor having the above-mentioned configuration, a surplus of oil 13 in the bearing can be stored in oil pool 6a on the outer periphery of the sleeve through ventilation groove 1b, and it is thus possible to increase the acceptable variation and the supply amount of oil.

It is to be noted that a copper alloy such as C3604 and BC6C is used as the material of sleeve 6 in consideration of the cutting performance and/or the rolling performance, and a stainless steel such as SUS420J2 is used as the material of rotating shaft 9 in consideration of the wear resistance and/or the handleability. In addition, fluorinated synthetic oil is used as oil 13 in view of ensuring high temperature heat resistance, and an additive is added thereto in order to slightly improve the extreme pressure performance.

In the heat sink apparatus of the present embodiment, when the rotor of the electric motor is rotated, fan 8 (blade) is also rotated, and air is sucked along the axis direction of rotating shaft 9 of the electric motor. The sucked air is exhausted from the opening provided in the side wall of frame 1. At this time, the air flow removes the heat of frame 1 transferred from the heat generation member. In this manner, the heat generation member is cooled.

(Shape and Dimension of Rotating Shaft 9)

Now the shape and the dimension of rotating shaft 9 of the present embodiment are described with reference to FIGS. 2A to 2E. It is to be noted that the examples of rotating shaft 9 illustrated in FIGS. 2A to 2E are different in their taper angles.

Rotating shaft 9 has a straight columnar shape whose diameter is constant. Front end part 9a of the free end of rotating shaft 9 is finished in the form of a spherical surface. Knurling for attaching to rotor main body 10 is provided on rear end part 9b of rotating shaft 9.

In addition, tapered part 9d having a tapered shape whose diameter decreases toward front end part 9a side is formed at a center portion (a portion where no dynamic pressure is generated) of rotating shaft 9. With this configuration, base part 9c (a portion other than front end part 9a and rear end part 9b) of rotating shaft 9 is sectioned into tapered part 9d, first straight part 9e on front end part 9a side, and second straight part 9f on rear end part 9b side. It is to be noted that constriction part 9g is formed at the connecting portion between tapered part 9d and first straight part 9e. In addition, constriction part 9h is formed at the connecting portion between rear end part 9b and second straight part 9f.

Dynamic-pressure generation grooves may be formed on the outer peripheral surfaces of first straight part 9e and second straight part 9f.

Rotating shaft 9 has a total length of 9 mm and an outer diameter of 1.2 mm, for example. In addition, first straight part 9e has a length of 1.4 mm, tapered part 9d including constriction part 9g has a length of 2.2 mm, and second straight part 9f has a length of 2.9 mm, for example.

(Effect)

As described above, in the present embodiment, tapered part 9d is formed at a center portion of rotating shaft 9 of the electric motor. With this configuration, by a capillary force, oil 13 can be intimately applied to a part (second straight part 9f) of rotating shaft 9 on rotor main body 10 side, and it is thus possible to achieve longer life time in comparison with a conventional art.

To prove the above-mentioned effects, the present inventors conducted durability tests with rotating shaft 9 provided with tapered part 9d illustrated in FIGS. 2A to 2E and a rotating shaft provided with a step in which a recessed groove (having a depth of approximately 0.1 mm) is formed in place of tapered part 9d.

The tests were conducted under the same condition. In the condition where the outside air temperature was 120° C., the lifetime of the apparatus using the rotating shaft provided with a step was approximately 1,200 hours, whereas the lifetime of the apparatus using rotating shaft 9 provided with tapered part 9d was approximately 2,200 hours. In addition, in the condition where the outside air temperature was 100° C., the lifetime of the apparatus using the rotating shaft provided with a step was approximately 2,000 hours, whereas no defect was caused in the apparatus using rotating shaft 9 provided with tapered part 9d even after the apparatus was operated for 8,000 hours or more.

Figure 2A:
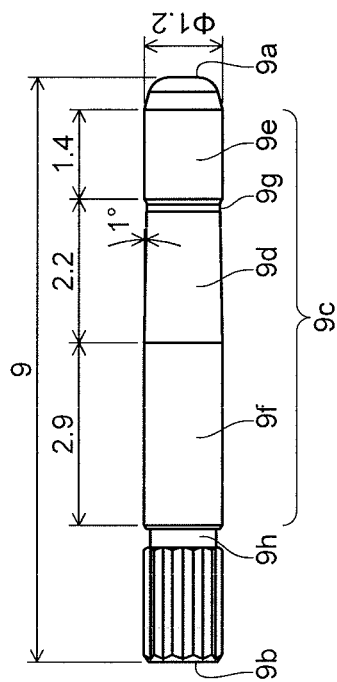
FIGS. 2A to 2E illustrate external shapes of a rotating shaft of the electric motor according to Embodiment 1 of the present disclosure.
Figure 2B:
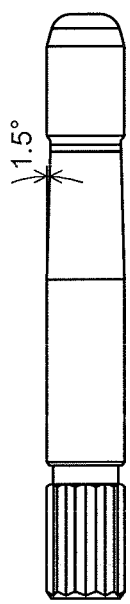
Figure 2C:
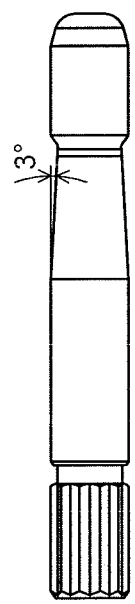
Figure 2D:
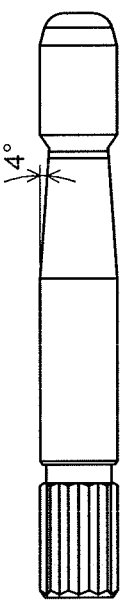
Figure 2E:
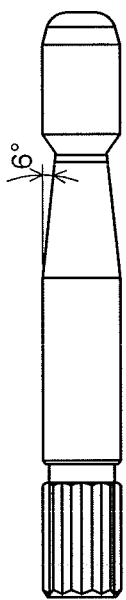

In addition, as a result of a study on the capillary force, it was confirmed that the desirable taper angle of tapered part 9d is 1 to 3 degrees (FIGS. 2A to 2C).

In addition, it was confirmed that a similar effect is achieved also in the case where a step part provided with multi steps whose diameters decrease toward front end part 9a side is formed in place of tapered part 9d at a center portion (a portion where no dynamic pressure is generated) of rotating shaft 9.

It is to be noted that, in the present embodiment, the sizes of the parts of rotating shaft 9 are not limited to the above-mentioned sizes. In rotating shaft 9, the range of the length of first straight part 9e is 1 to 3 mm, the range of the length of tapered part 9d including constriction part 9g is 0.5 to 4 mm, and the range of the length of second straight part 9f is 1.5 to 5 mm.

In addition, rear end part 9b of rotating shaft 9 may not be provided with knurling, and constriction part 9h may not be formed. In this case, second straight part 9f may have a length of 5 mm or greater.

Embodiment 2

Tapered part 9d is provided in rotating shaft 9 in Embodiment 1. In Embodiment 2, tapered part 6d (see FIG. 4) is provided in sleeve 6.
(Configuration of Electric Motor)

Figure 3:
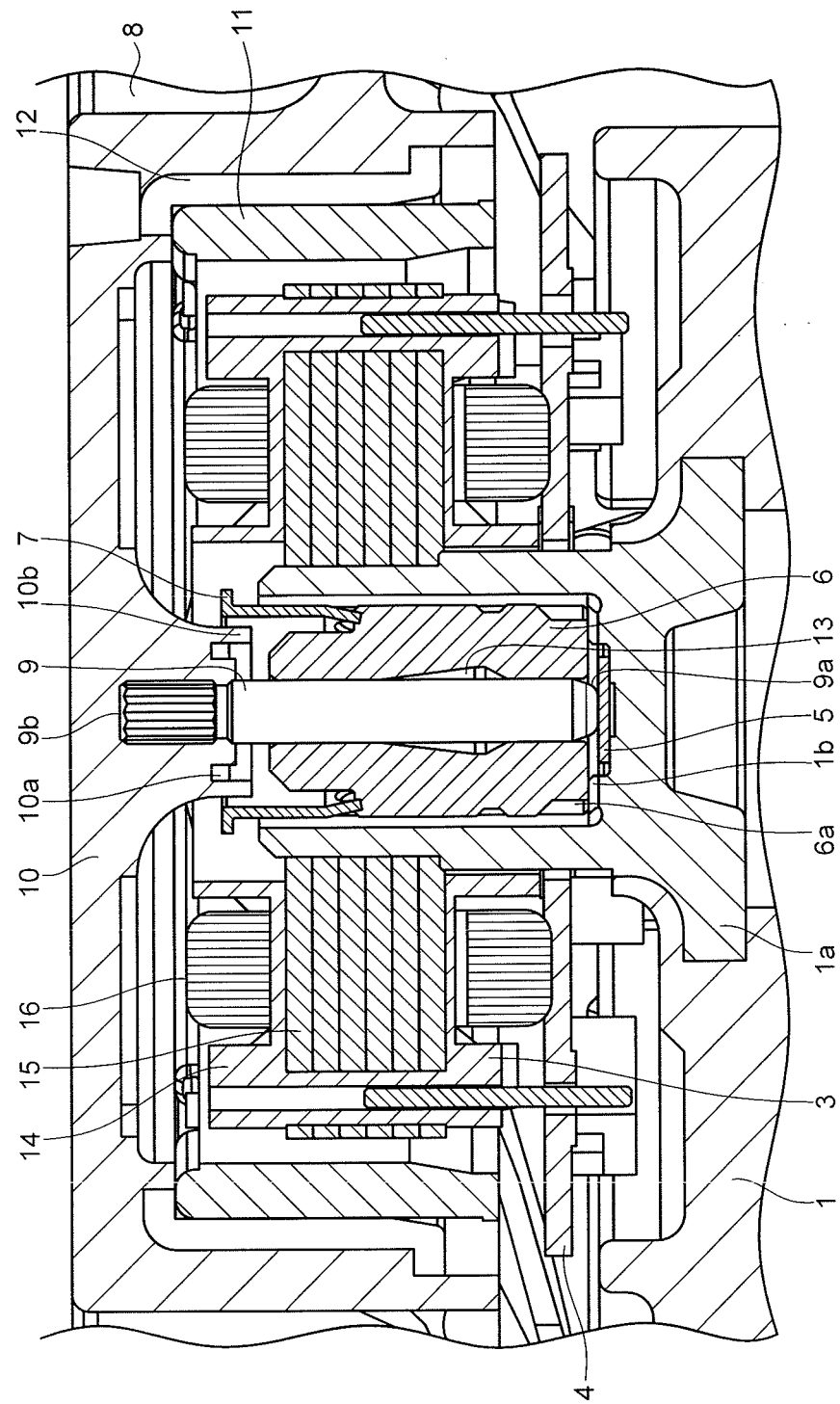
FIG. 3 is a sectional view of an electric motor in a heat sink apparatus according to Embodiment 2 of the present disclosure.

FIG. 3 is a sectional view of an electric motor in a heat sink apparatus of Embodiment 2. The heat sink apparatus illustrated in FIG. 3 is different from the heat sink apparatus illustrated in FIG. 1 in shapes of sleeve 6 and rotating shaft 9.

In the present embodiment, rotating shaft 9 is not provided with tapered part 9d and constriction part 9g, and the entirety of base part 9c is a straight part.
(Shape and Dimension of Sleeve 6)

Figure 4:
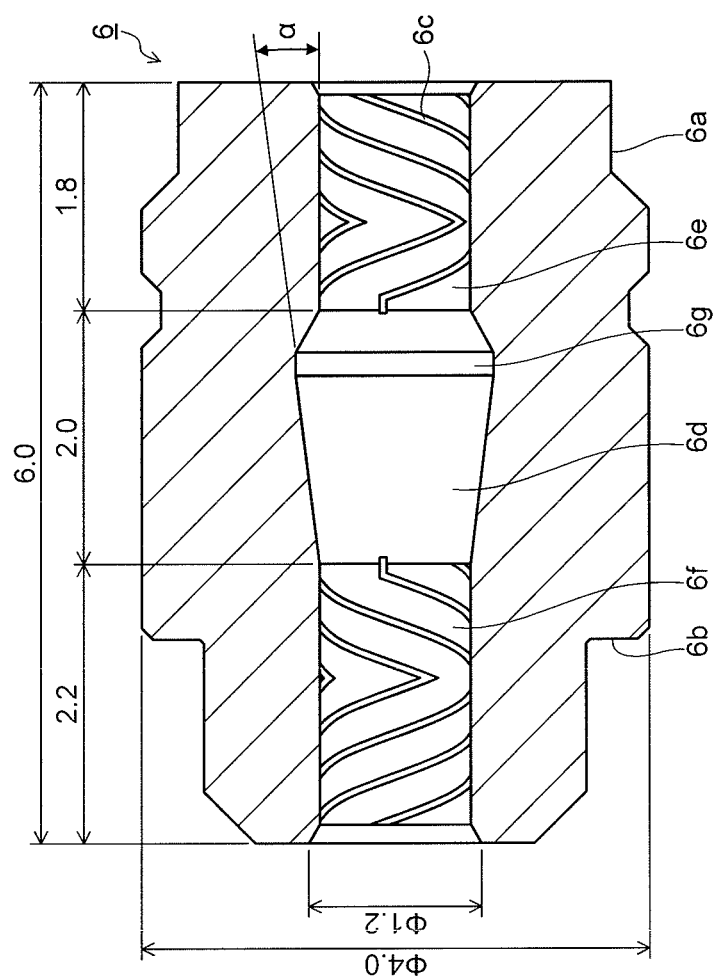
FIG. 4 illustrates an external shape of a sleeve of the electric motor according to Embodiment 2 of the present disclosure.

Now the shape and the dimension of sleeve 6 of the present embodiment are described with reference to FIG. 4. Sleeve 6 has a cylindrical shape. Oil pool 6a that is a circumferential groove is formed on the outer peripheral surface of sleeve 6 on the from end side, and a step part 6b that is a circumferential groove is formed on the outer peripheral surface of sleeve 6 on the rear end side.

In addition, tapered part 6d having a tapered shape whose diameter increases toward the front end side is formed at a center portion (a portion where no dynamic pressure is generated) of the inner peripheral surface of sleeve 6. With this configuration, the inner peripheral surface of sleeve 6 is sectioned into tapered part 6d, first straight part 6e on the front end side, and second straight part 6f on the rear end side. It is to be noted that a clearance part 6g is formed at the connecting portion between tapered part 6d and first straight part 6e.

Dynamic-pressure generation groove 6c is formed on the outer peripheral surfaces of first straight part 6e and second straight part 6f.

The sleeve 6 has a total length of 6.0 mm, an outer diameter of 4.0 mm, and an inner diameter of 1.2 mm, for example. In addition, first straight part 6e has a length of 1.8 mm, tapered part 6d including clearance part 6g has a length of 2.0 mm, and second straight part 6f has a length of 2.2 mm, for example.
(Effect)

As described above, in the present embodiment, tapered part 6d is formed at a center portion of sleeve 6 of the electric motor. With this configuration, oil 13 can be intimately applied to a portion of rotating shaft 9 on rotor main body 10 side by a capillary force, and it is thus possible to achieve longer life time in comparison with a conventional art.

In addition, as a result of a study on the capillary force, it was confirmed that the desirable taper angle α of tapered part 6d is 1 to 10 degrees.

In addition, it was confirmed that a similar effect is achieved also in the case where a step part provided with multi steps whose diameters increase toward the front end side is formed at a center portion (a portion where no dynamic pressure is generated) of sleeve 6 in place of tapered part 6d.

It is to be noted that, in the present embodiment, the sizes of the parts of sleeve 6 are not limited to the above-mentioned sizes. In sleeve 6, the range of the length of first straight part 6e is 1 to 3 mm, the range of the length of tapered part 6d including clearance part 6g is 0.5 to 4 mm, and the range of the length of second straight part 6f is 1.5 to 5 mm.

Embodiment 3

(Configuration of Electric Motor)

Figure 5:
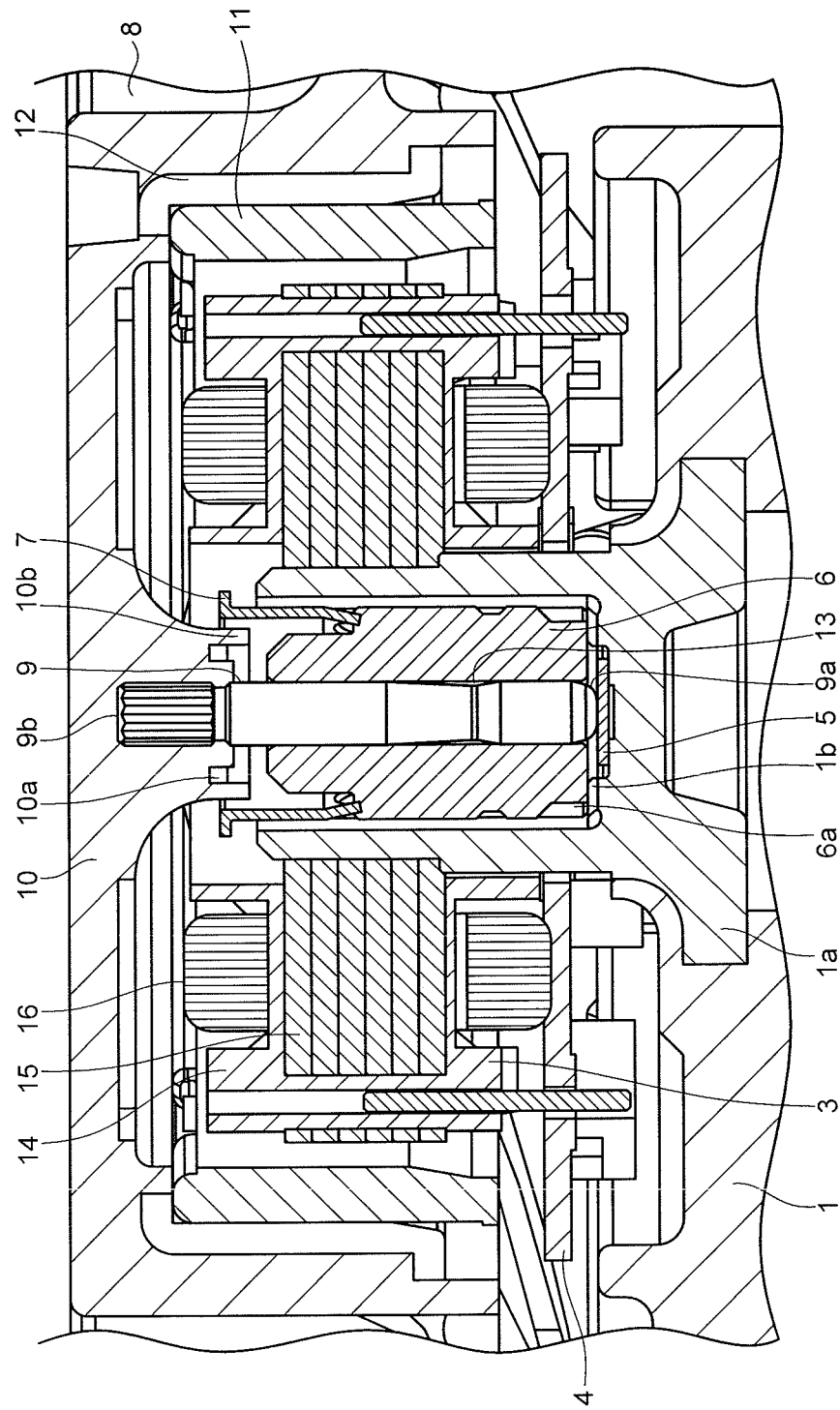
FIG. 5 is a sectional view of an electric motor in a heat sink apparatus according to Embodiment 3 of the present disclosure.
Figure 6A:
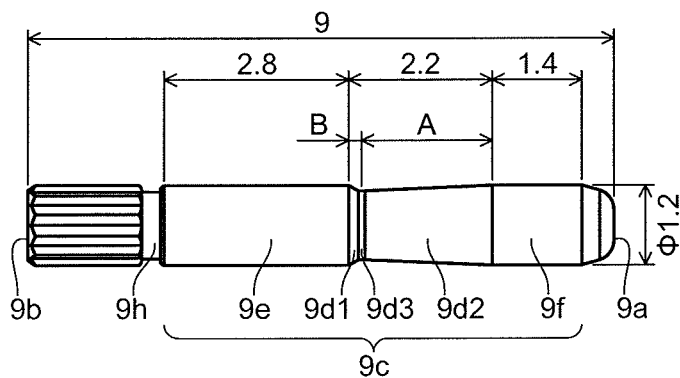
FIGS. 6A to 6F illustrate external shapes of a rotating shaft of the electric motor according to Embodiment 3 of the present disclosure.
Figure 6B:
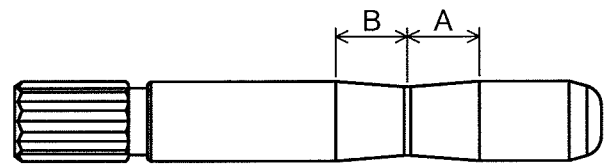
Figure 6C:
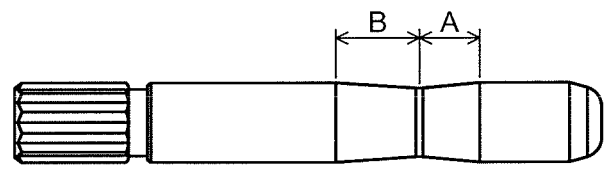
Figure 6D:
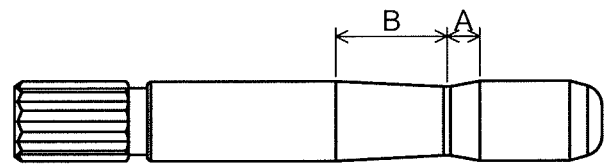
Figure 6E:
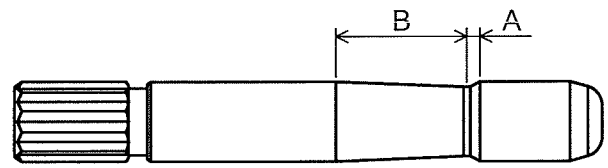
Figure 6F:
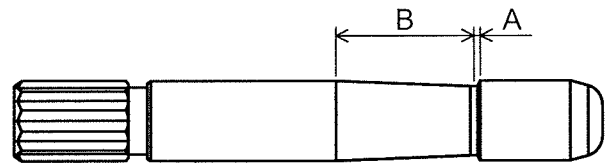

FIG. 5 is a sectional view of an electric motor in a heat sink apparatus of Embodiment 3. The heat sink apparatus illustrated in FIG. 5 is different from the heat sink apparatus illustrated in FIG. 1 in shape of rotating shaft 9.

In the present embodiment, neither tapered part 9d or constriction part 9g is formed at a center portion of rotating shaft 9, and first tapered part 9d1 and second tapered part 9d2 are formed in place of tapered part 9d and constriction part 9g (see FIGS. 6A to 6F).
(Shape and Dimension of Rotating Shaft 9)

Now the shape and the dimension of rotating shaft 9 of the present embodiment are described with reference to FIGS. 6A to 6F. It is to be noted that the examples of rotating shaft 9 illustrated in FIGS. 6A to 6F are different in their ratios between the length of first tapered part 9d1 and the length of second tapered part 9d2.

At a center portion (a portion where no dynamic pressure is generated) of rotating shaft 9, first tapered part 9d1 having a tapered shape whose diameter decreases toward front end part 9a side and second tapered part 9d2 having a tapered shape whose diameter increases toward front end part 9a side are formed. With this configuration, base part 9c (a portion other than front end part 9a and rear end part 9b) of rotating shaft 9 is sectioned into first tapered part 9d1, second tapered part 9d2, first straight part 9e on front end part 9a side, and second straight part 9f on rear end part 9b side. It is to be noted that, in view of ease of working and the like, third straight part 9d3 may be formed at the connecting portion between first tapered part 9d1 and second tapered part 9d2.

A region including first tapered part 9d1, second tapered part 9d2 and third straight part 9d3 (hereinafter referred to as "tapered region") serves as an oil pool.

Rotating shaft 9 has a total length of 9 mm, and an outer diameter of 1.2 mm, for example. In addition, first straight part 9e has a length of 1.4 mm, the tapered region has a length of 2.2 mm, and second straight part 9f has a length of 2.8 mm, for example.
(Study on Capillary Force)

The present inventors studied the capillary force in rotating shafts 9 illustrated in FIGS. 6A to 6F. The resulting evaluations are shown in FIG. 7.

It was confirmed that in the case where first tapered part 9d1 is longer than second tapered part 9d2, that is, in the case where the ratio of the length of first tapered part 9d1 ("B" in FIGS. 6A to 6F and FIG. 7) to the length of second tapered part 9d2 ("A" in FIGS. 6A to 6F and FIG. 7) is greater than 1 (FIGS. 6C, 6D, 6E, and 6F), the bubbles in the tapered region can be moved to front end part 9a side, and oil 13 in the tapered region can be moved to rotor main body 10 side of rotating shaft 9 by a capillary force (the evaluation "good" or "fair" in FIG. 7). In addition, it was confirmed that the desirable taper angle of first tapered part 9d1 is 1 to 10 degrees.

Also, it was confirmed that in the case where first tapered part 9d1 is shorter than second tapered part 9d2, that is, in the case where the ratio of the length of first tapered part 9d1 to the length of second tapered part 9d2 is smaller than 1 (FIG. 6A), the bubbles in the tapered region are moved to rotor main body 10 side and consequently oil 13 in the tapered region cannot be moved to rotor main body 10 side (the evaluation "poor" in FIG. 7).

Also, it was confirmed that in the case where the length of first tapered part 9d1 is approximately equal to the length of second tapered part 9d2 (FIG. 6B), the bubbles in the tapered region do not move and consequently oil 13 in the tapered region cannot be sufficiently moved to rotor main body 10 side (the evaluation "poor" in FIG. 7).

(Effect)

As described above, in the present embodiment, first tapered part 9d1 whose diameter decreases toward front end part 9a side and second tapered part 9d2 whose diameter increases toward front end part 9a side are formed at a center portion of rotating shaft 9 of the electric motor such that first tapered part 9d1 is longer than second tapered part 9d2. With this configuration, oil 13 can be intimately applied to a portion of rotating shaft 9 on rotor main body 10 side (second straight part 9f) by a capillary force, and it is thus possible to achieve longer life time in comparison with a conventional art.

It is to be noted that, in the present embodiment, the sizes of the parts of rotating shaft 9 are not limited to the above-mentioned sizes. In rotating shaft 9, the range of the length of first straight part 9e is 1.5 to 10 mm, the range of the length of tapered region is 0.5 to 4 mm, and the range of the length of second straight part 9f is 1 to 8 mm.

In addition, the connecting portion between first tapered part 9d1 and second tapered part 9d2 may have shapes other than that of third straight part 9d3 such as a tapered part and a constriction part.

In addition, rear end part 9b of rotating shaft 9 may not be provided with knurling, and constriction part 9h may not be formed. In this case, first straight part 9e may have a length of 5 mm or greater.

Embodiment 4

First tapered part 9d1 and second tapered part 9d2 are provided in rotating shaft 9 in Embodiment 3. In Embodiment 4, first tapered part 6d1 and second tapered part 6d2 (see FIGS. 9A to 9F) are provided in sleeve 6.

(Configuration of Electric Motor)

Figure 8:
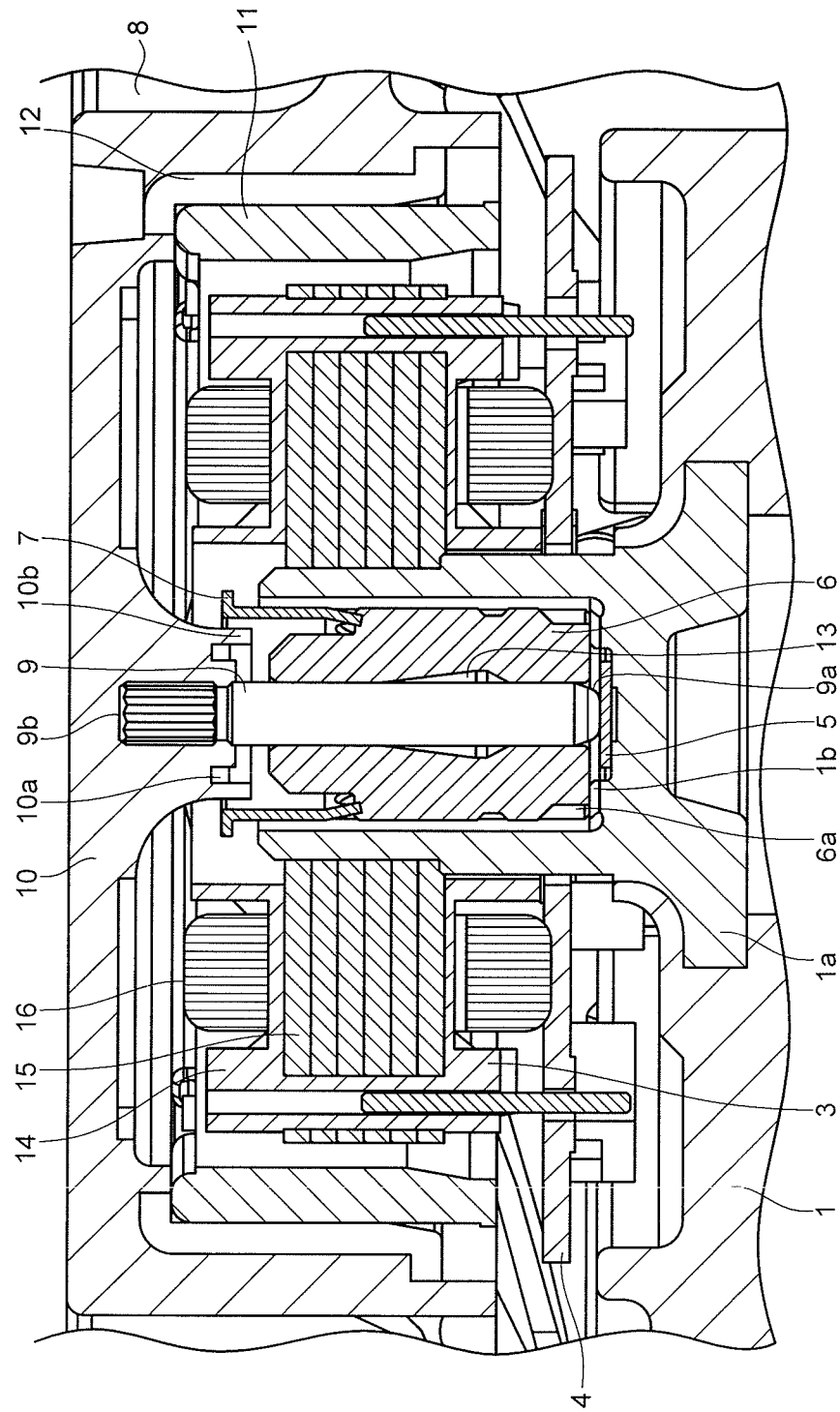
FIG. 8 is a sectional view of an electric motor in a heat sink apparatus according to Embodiment 4 of the present disclosure.
Figure 9:
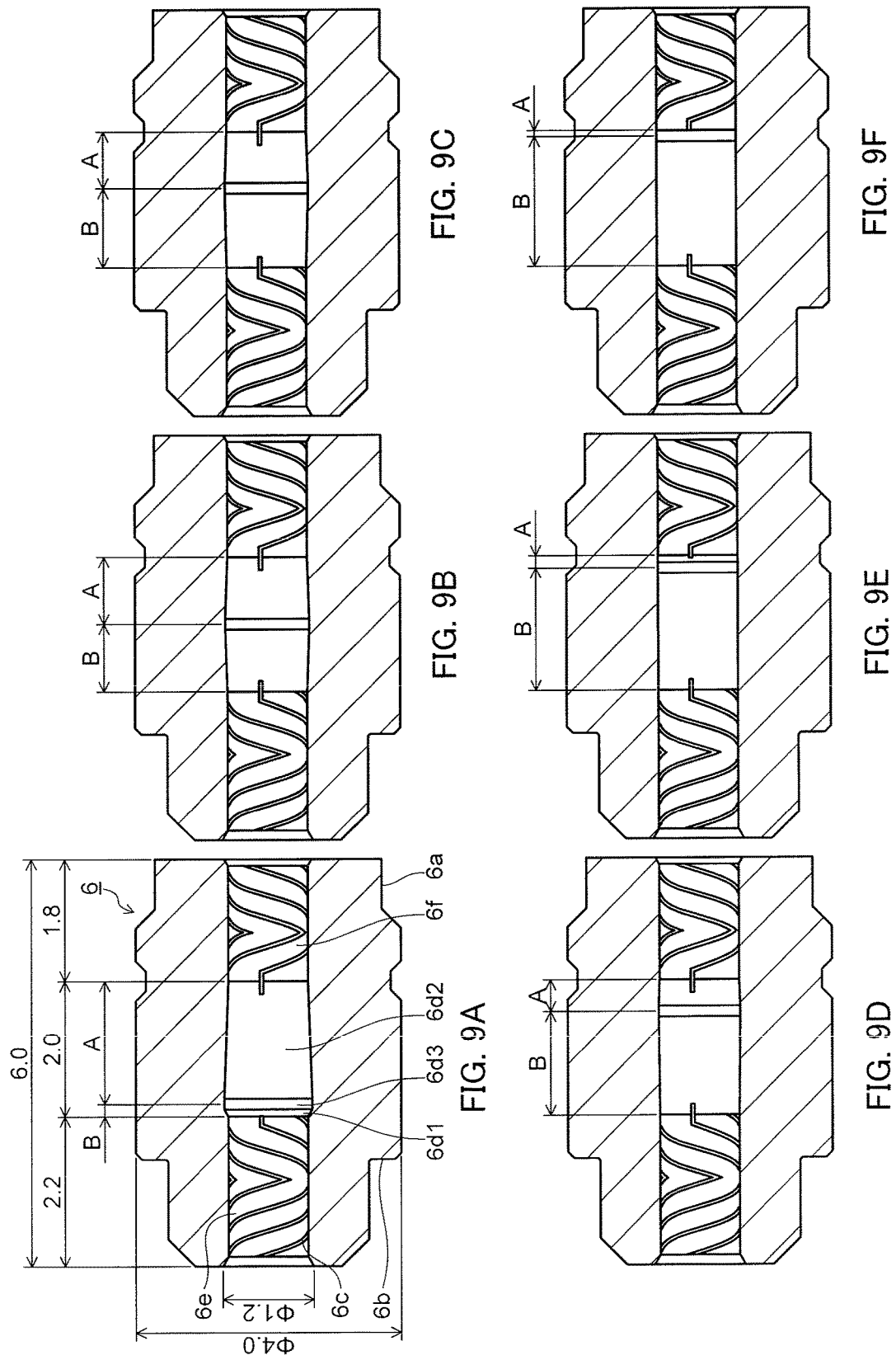
FIGS. 9A to 9F illustrate external shapes of a sleeve of the electric motor according to Embodiment 4 of the present disclosure.

FIG. 8 is a sectional view of an electric motor in a heat sink apparatus of Embodiment 4. The heat sink apparatus illustrated in FIG. 8 is different from the heat sink apparatus illustrated in FIG. 5 in shapes of sleeve 6 and rotating shaft 9.

In the present embodiment, rotating shaft 9 is provided with no tapered region, and the entirety of base part 9c is a straight part.

(Shape and Dimension of Sleeve 6)

Now the shape and the dimension of sleeve 6 of the present embodiment are described with reference to FIGS. 9A to 9F. It is to be noted that the examples of sleeve 6 illustrated in FIGS. 9A to 9F are different in their ratios between the length of first tapered part 6d1 and the length of second tapered part 6d2.

Sleeve 6 has a cylindrical shape. Oil pool 6a that is a circumferential groove is formed on the outer peripheral surface of sleeve 6 on the front end side, and step part 6b that is a circumferential groove is formed on the outer peripheral surface of sleeve 6 on the rear end side.

In addition, first tapered part 6d1 having a tapered shape whose diameter increases toward the front end side and second tapered part 6d2 having a tapered shape whose diameter decreases toward the front end side are formed at a center portion (a portion where no dynamic pressure is generated) of the inner peripheral surface of sleeve 6. With this configuration, the inner peripheral surface of sleeve 6 is sectioned into first tapered part 6d1, second tapered part 6d2, first straight part 6e on the front end side, and second straight part 6f on the rear end side. It is to be noted that, in view of ease of working and the like, third straight part 6d3 may be formed at the connecting portion between first tapered part 6d1 and second tapered part 6d2.

A region including first tapered part 6d1, second tapered part 6d2 and third straight part 6d3 (hereinafter referred to as "tapered region") serves as an oil pool.

Dynamic-pressure generation groove 6c is formed on the outer peripheral surfaces of first straight part 6e and second straight part 6f.

Sleeve 6 has a total length of 6.0 mm, an outer diameter of 4.0 mm, and an inner diameter of 1.2 mm, for example. In addition, first straight part 6e has a length of 1.8 mm, the tapered region has a length of 2.0 mm, and second straight part 6f has a length of 2.2 mm, for example.

(Study on Capillary Force)

The present inventors studied the capillary force in sleeves 6 illustrated in FIGS. 9A to 9F. The resulting evaluations are shown in FIG. 10.

It was confirmed that in the case where first tapered part 6d1 is longer than second tapered part 6d2, that is, in the case where the ratio of the length of first tapered part 6d1 ("B" in FIGS. 9A to 9F and FIG. 10) to the length of second tapered part 6d2 ("A" in FIGS. 9A to 9F and FIG. 10) is greater than 1 (FIGS. 9C, 9D, 9E and 9F), the bubbles in the tapered region can be moved to the front end side, and oil 13 in the tapered region can be moved to rotor main body 10 side of rotating shaft 9 by a capillary force (the evaluation "good" or "fair" in FIG. 10). In addition, it was confirmed that the desirable taper angle of first tapered part 6d1 is 1 to 10 degrees.

In addition, it was confirmed that in the case where first tapered part 6d1 is shorter than second tapered part 6d2, that is, in the case where the ratio of the length of first tapered part 6d1 to the length of second tapered part 6d2 is smaller than 1 (FIG. 9A), the bubbles in the tapered region move to rotor main body 10 side and consequently oil 13 in the tapered region cannot be moved to rotor main body 10 side (the evaluation "poor" in FIG. 10).

In addition, it was confirmed that in the case where the length of first tapered part 6d1 is approximately equal to the length of second tapered part 6d2 (FIG. 9B), the bubbles in the tapered region do not move and consequently oil 13 in the tapered region cannot be sufficiently moved to rotor main body 10 side (the evaluation "poor" in FIG. 10).

(Effect)

As described above, in the present embodiment, first tapered part 6*d*1 whose diameter increases toward the front end side of rotating shaft 9 and second tapered part 6*d*2 whose diameter decreases toward the front end side of rotating shaft 9 are formed at a center portion of sleeve 6 of the electric motor, and first tapered part 6*d*1 is longer than second tapered part 6*d*2 is. With this configuration, by a capillary force, oil 13 can be intimately applied to a portion of rotating shaft 9 on rotor main body 10 side (second straight part 9*f*), and it is thus possible to achieve longer life time in comparison with a conventional art.

It is to be noted that, in the present embodiment, the sizes of the parts of sleeve 6 are not limited to the above-mentioned sizes. In sleeve 6, the range of the length of first straight part 6*e* is 1.5 to 10 mm, the range of the length of tapered region is 0.5 to 4 mm, and the range of the length of second straight part 6*f* is 1 to 8 mm.

In addition, the connecting portion between first tapered part 6*d*1 and second tapered part 6*d*2 may have shapes other than that of third straight part 6*d*3 such as a tapered part and a constriction part.

The present invention is not limited to the drawings and the embodiments described above. It should be understood by those skilled in the art that various modifications, combinations, sub-combinations and alterations may occur depending on design requirements and other factors in so far as they are within the scope of the appended claims or the equivalents thereof.

While the electric motor is used for a heat sink apparatus in the embodiments, the present invention is not limited to this, and the electric motor may also be used for other apparatuses such as an exhaust fan.

An electric motor according to a mode of the present disclosure includes: a frame including a frame housing having a cylindrical shape whose one end is open; a sleeve fitted in the frame housing; a stator attached to an outer peripheral part of the frame housing; and a rotor including a rotating shaft rotatably and pivotally supported by the sleeve, and a magnet that is disposed opposite to the stator, one end of the rotating shaft being fixed. The rotating shaft has a columnar shape. A tapered part having a tapered shape whose diameter decreases toward a side of a front end of the rotating shaft is formed in a center portion of the rotating shaft, the front end being a free end. A length of the tapered part is greater than a diameter of the rotating shaft. Oil is provided to a gap between the rotating shaft and the sleeve.

In the electric motor above, the tapered part has a taper angle of 1 to 3 degrees.

In the electric motor above, the tapered part is sandwiched between two straight parts, each of the two straight parts having a constant diameter.

In the electric motor above, a second tapered part having a tapered shape whose diameter decreases toward a side of a fixed end of the rotating shaft is formed in the center portion of the rotating shaft, the second tapered part being formed to extend from a first straight part that is one of the two straight parts on the free end side. The tapered part is formed to extend from a second straight part that is another of the two straight parts on the fixed end side. A length of the tapered part is greater than a length of the second tapered part. A taper angle of the tapered part is smaller than a taper angle of the second tapered part.

An electric motor according to a mode of the present disclosure includes: a frame including a frame housing having a cylindrical shape whose one end is open; a sleeve fitted in the frame housing; a stator attached to an outer peripheral part of the frame housing; and a rotor including a rotating shaft rotatably and pivotally supported by the sleeve, and a magnet that is disposed opposite to the stator, one end of the rotating shaft being fixed. The rotating shaft has a columnar shape. A step part provided with a plurality of steps whose diameters decrease toward a side of a front end of the rotating shaft is formed in a center portion of the rotating shaft, the front end being a free end. A length of the step part is greater than a diameter of the rotating shaft. Oil is provided to a gap between the rotating shaft and the sleeve.

In the electric motor above, the step part is sandwiched between two straight parts, each of the two straight parts having a constant diameter.

In the electric motor above, a dynamic-pressure generation groove that holds the oil is formed in at least one of an outer peripheral surface of the rotating shaft and an inner peripheral surface of the sleeve.

A heat sink apparatus according to a mode of the present disclosure is a cooling fan motor including the electric motor above. A heat generation member is attachable to the frame of the electric motor.

In the electric motor above, a second tapered part having a tapered shape whose diameter increases toward the free end side is formed in the center portion of the rotating shaft. A length of the tapered part is greater than a length of the second tapered part.

In the electric motor above, a taper angle of the tapered part is 1 to 10 degrees.

In the electric motor above, a sum of the length of the tapered part and the length of the second tapered part is greater than a diameter of the rotating shaft.

A heat sink apparatus according to a mode of the present disclosure is a cooling fan motor including the electric motor above. A heat generation member is attachable to the frame of the electric motor.

INDUSTRIAL APPLICABILITY

The present invention is suitable for an electric motor and a heat sink apparatus using the same.

REVERENCE SIGNS LIST

1 Frame
1*a* Frame housing
3 Stator
5 Thrustor
6 Sleeve
6*c* Dynamic-pressure generation groove
6*d* Tapered part
6*d*1 First tapered part
6*d*2 Second tapered part
6*d*3 Third straight part
6*e* First straight part
6*f* Second straight part
7 Fixation ring
8 Fan
9 Rotating shaft
9*a* Front end part
9*b* Rear end part
9*c* Base part
9*d* Tapered part
9*d*1 First tapered part
9*d*2 Second tapered part
9*d*3 Third straight part
9*e* First straight part 9f Second straight part
9g Constriction part
10 Rotor main body
11 Magnet
12 Magnet yoke
13 Oil

The invention claimed is:

1. An electric motor comprising:
a frame including a frame housing having a cylindrical shape whose one end is open;
a sleeve fitted in the frame housing;
a stator attached to an outer peripheral part of the frame housing; and
a rotor including a rotating shaft rotatably and pivotally supported by the sleeve, and a magnet that is disposed opposite to the stator, one end of the rotating shaft being fixed, wherein:
the rotating shaft has a columnar shape;
a tapered part having a tapered shape whose diameter decreases toward a side of a front end of the rotating shaft is formed in a center portion of the rotating shaft, the front end being a free end;
a length of the tapered part is greater than a diameter of the rotating shaft; and
oil is provided to a gap between the rotating shaft and the sleeve.

2. The electric motor according to claim 1, wherein the tapered part has a taper angle of 1 to 3 degrees.

3. The electric motor according to claim 1, wherein the tapered part is sandwiched between two straight parts, each of the two straight parts having a constant diameter.

4. The electric motor according to claim 3, wherein:
a second tapered part having a tapered shape whose diameter decreases toward a side of a fixed end of the rotating shaft is formed in the center portion of the rotating shaft, the second tapered part being formed to extend from a first straight part that is one of the two straight parts on the free end side;
the tapered part is formed to extend from a second straight part that is another of the two straight parts on the fixed end side;
a length of the tapered part is greater than a length of the second tapered part; and
a taper angle of the tapered part is smaller than a taper angle of the second tapered part.

5. An electric motor comprising:
a frame including a frame housing having a cylindrical shape whose one end is open;
a sleeve fitted in the frame housing;
a stator attached to an outer peripheral part of the frame housing; and
a rotor including a rotating shaft rotatably and pivotally supported by the sleeve, and a magnet that is disposed opposite to the stator, one end of the rotating shaft being fixed, wherein:
the rotating shaft has a columnar shape;
a step part provided with a plurality of steps whose diameters decrease toward a side of a front end of the rotating shaft is formed in a center portion of the rotating shaft, the front end being a free end;
a length of the step part is greater than a diameter of the rotating shaft; and
oil is provided to a gap between the rotating shaft and the sleeve.

6. The electric motor according to claim 5, wherein the step part is sandwiched between two straight parts, each of the two straight parts having a constant diameter.

7. The electric motor according to claim 1, wherein a dynamic-pressure generation groove that holds the oil is formed in at least one of an outer peripheral surface of the rotating shaft and an inner peripheral surface of the sleeve.

8. A heat sink apparatus that is a cooling fan motor including the electric motor according to claim 1, wherein a heat generation member is attachable to the frame of the electric motor.

* * * * *